United States Patent [19]
Crane

[11] Patent Number: 4,953,909
[45] Date of Patent: Sep. 4, 1990

[54] VEHICLE HOOD PROTECTOR WITH SPECIALIZED ATTACHING APPARATUS

[76] Inventor: Timothy N. F. Crane, 1140 N. Clark, Suite 209, West Hollywood, Calif. 90069

[21] Appl. No.: 450,735
[22] Filed: Dec. 14, 1989
[51] Int. Cl.⁵ ............................................. B62D 25/00
[52] U.S. Cl. ...................................... 296/136; 280/770
[58] Field of Search ................. 296/136, 95.1; 280/770

[56] References Cited

U.S. PATENT DOCUMENTS 4,219,218  8/1980  Waldon ................................. 296/136

FOREIGN PATENT DOCUMENTS 1559176  1/1980  United Kingdom ............... 296/95.1

Primary Examiner—Robert R. Song
Attorney, Agent, or Firm—Thomas I. Rozsa

[57] ABSTRACT

A decorative and functional vehicle hood protector which is aesthetic in appearance so as not to detract from the overall appearance of the vehicle, is functional in that it securely protects the vehicle from damage by dirt and debris which may fall on or be thrown upon the hood and which has an anti-theft attaching means to prevent a thief from stealing the hood protector when the vehicle is left unattended on the street or in a public parking lot. The hood shield is made of one piece of clear material conformed to the shape of the hood of a vehicle. The hood shield is retained on the hood by an attaching apparatus which is held in place through a channel member wedged onto the edge of the hood and wedged in the groove between the hood and the fender of a vehicle. The apparatus includes the combination of a hood retaining block and a retaining block attaching member located at four spaced apart locations between the hood shield and the hood at approximately the front corners of the hood and at the rear corner intersections of the hood shield and the hood to provide a stable attaching mechanism to securely retain the hood shield on the hood of a vehicle.

8 Claims, 2 Drawing Sheets

VEHICLE HOOD PROTECTOR WITH SPECIALIZED ATTACHING APPARATUS

BACKGROUND OF THE INVENTION

1. Field of the Invention

The present invention relates to the field of vehicle hood protectors used to protect the hood of vehicles from various objects that can fall on it after they are thrown against the vehicle by the impact of the wheels against the road such as rocks, pebbles, sand and other debris which may be on the road. While such hood protectors are customarily used with expensive sports cars which have fine paint finishes and are designed low to the ground, the field also relates to car hood protectors for any type of vehicle hood and primarily for cars and trucks.

2. Description of the Prior Art

In general, vehicle hood protectors are known. The most common type which is currently in use is a plastic or vinyl type covering which is stretched over the hood of the vehicle and is retained in place by various attaching means. A major problem with this type of hood protector is that it is ugly and detracts from the appearance of the vehicle. This is a major drawback when the vehicle is a beautiful and expensive sports car. A second drawback is that in most designs, the protector must be removed when the hood is to be raised to get at the engine well for purposes of checking oil, the battery, etc. . A third and major disadvantage with prior art hood protectors is that it can be easily stolen.

Other vehicle hood protectors known in the prior art are described in the following issued patents:

1. U.S. Pat. No. 4,159,845 issued to Bratsberg on Jul. 3, 1979 for "Airstream Deflector For Motor Vehicles".
2. U.S. Pat. No. 4,376,546 issued to Guccione on Mar. 15, 1983 "Vehicle Front End Shield".
3. U.S. Pat. No. 4,232,483 issued to Lockshin on Nov. 11, 1980 for "Hinged Louvered Window Shade Device".
4. U.S. Pat. No. 4,423,897 issued to Williams on Jan. 3, 1984 for "Window Ventilating Stop".
5. U.S. Pat. No. 4,570,467 issued to Greco on Feb. 18, 1986 for "Locking System For Rolling Type Gate".

None of these Patents disclose the present invention. U.S. Pat. No. 4,159,845 to Bratsberg discloses an air deflector shield which is placed in the front of the hood of a car and is used as an airstream deflector to deflect the air so that it does not hit the windshield full blast so that dust, bugs, rain or snowflakes are carried over the top of the vehicle instead of being deposited upon the windshield. However, this device does not serve the same purpose as the present invention in that it does not protect the hood itself from being damaged by various objects which can fall on it after they are thrown against the car by the impact of the wheels such as rocks and other debris which may be on the road. The method by which the device is attached to the front of the vehicle is also different from the attachment device of the present invention.

U.S. Pat. No. 4,376,546 to Guccione discloses a vehicle front end shield which is similar in concept to the present invention of having a clear plastic shield which is of greater strength than merely the leather covering protecting the front of the vehicle. In particular, they also reference use of this shield with a Porsche. Specifically the unit is usually housed in two halves which can be mated together and is form fitted to the front of the vehicle hood. One major difference between the present invention and this Patent is that the attachment of the shield to the vehicle is accomplished by strap hooks 40 each of which is mounted on a double spring 42 so that between the two hooks each of which engages an opposite wheel well, four point restraint is exerted on the shield. Obviously, this sort of attachment lends itself to more easily removing the shield from the front of the vehicle and therefore lends itself to being more easily stolen. In addition, in the preferred embodiment the piece is in two halves and the two halves must be locked together.

U.S. Pat. No. 4,232,483 to Lockshin basically involves a hinged louvered window shade and is relevant primarily because of the mounting means. The mounting means for the main body assembly is provided by a pair of top-side mounting plate assemblies designated as 16 and 18, and a pair of lower-side mounting assemblies designated as 20 and 22. Each of the mounting assemblies is illustrated in FIGS. 4, 6 and 7 and is comprised of a base plate 52 having a hinge 54 fixed at its outer face in a generally horizontal position. First hinge leaf 56 is fixed to plate 52 as by spot welding and a pivotal leaf 58 of hinge 54 is fixed by screws 60 to the top edge portion of the top louver 24.

U.S. Pat. No. 4,423,897 to Williams for Window Ventilating Stop is relevant principally because of the nature of the attaching mechanism as shown in particular in FIG. 5. There is a slot which attaches on to a keeper and is attached thereto through the use of bolts or screws.

U.S. Pat. No. 4,570,467 to Greco discloses a locking system which includes a sleeve member locked on to a flat member that goes within the sleeve member.

Therefore, there is a significant need for a vehicle hood protector which is aesthetic in appearance and is functional in that it protects the hood from being dented and damaged by objects and debris which may be thrown against it, and has a specialized attaching mechanism to prevent it from being easily stolen while at the same time permitting access to the engine compartment without the necessity of removing the hood.

SUMMARY OF THE INVENTION

The present invention is a decorative and functional vehicle hood protector which is aesthetic in appearance so as not to detract from the overall appearance of the vehicle, is functional in that it securely protects the vehicle from damage by dirt and debris which may fall on or be thrown upon the hood and which has an anti-theft attaching means to prevent a thief from stealing the hood protector when the vehicle is left unattended on the street or in a public parking lot.

It has been discovered, according to the present invention, that if a hood shield is made of one piece of clear material conformed to the shape of the hood of a vehicle, then the shield can act as a protective barrier to prevent rocks and other debris which are thrown upon the hood from marring the hood, while at the same time functioning as a decorative accessory which does not detract from the appearance of the vehicle.

It has further been discovered, according to the present invention, that if the hood shield is retained on the hood by an attaching apparatus which is held in place through a channel member wedged onto the edge of the hood and wedged in the groove between the hood and the fender of a vehicle, then the hood shield is safely retained on the vehicle in a manner by which it cannot be stolen off a locked vehicle even when the vehicle is left unattended on the street or in a public parking lot.

It has additionally been discovered, according to the present invention, that the combination of a hood retaining block and a retaining block attaching member located at four spaced apart locations between the hood shield and the hood at approximately the front corners of the hood and at the rear corner intersections of the hood shield and the hood provides a stable attaching mechanism to securely retain the hood shield on the hood of a vehicle.

It is therefore an object of the present invention to provide a hood shield which protects the hood of vehicle from rocks and other debris which may be thrown onto the hood.

It is a further object of the present invention to provide a hood shield which is decorative and does not detract from the appearance of the vehicle and also does not hide the surface of the hood from view.

It is an additional object of the present invention to provide a hood shield which is attached to the hood in a manner which prevents the hood shield form being removed from a locked vehicle with the hood in the closed position.

It is a further object of the present invention to provide a hood protector which permits the user to have access to the engine compartment of the vehicle without first requiring the hood protector to be removed.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENT

Figure 1:
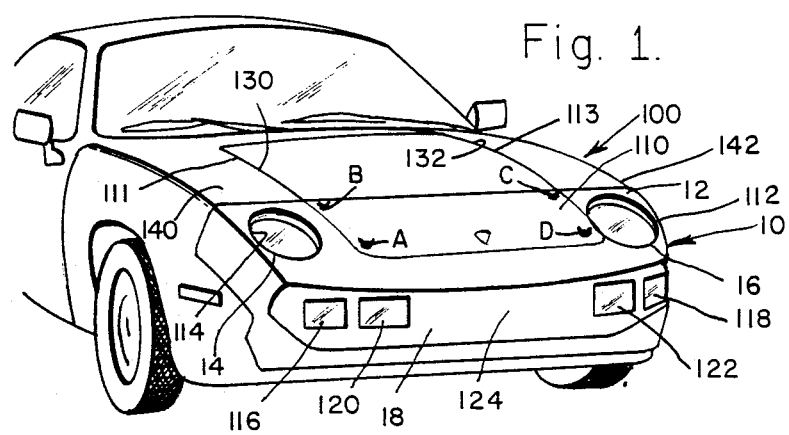
FIG. 1 is a perspective view of the present invention vehicle hood protector with specialized attaching apparatus in its operative position on the hood of a vehicle.
Figure 2:
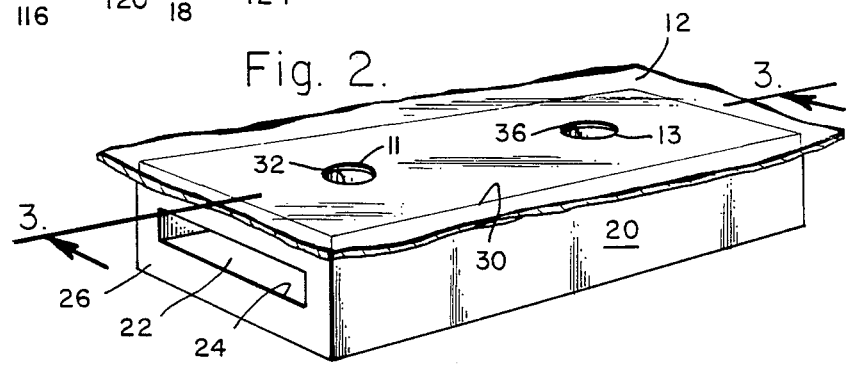
FIG. 2 is a perspective view of one of the retaining blocks for the hood protector with a perspective view of part of the vehicle hood protector set on top of the retaining block.
Figure 3:
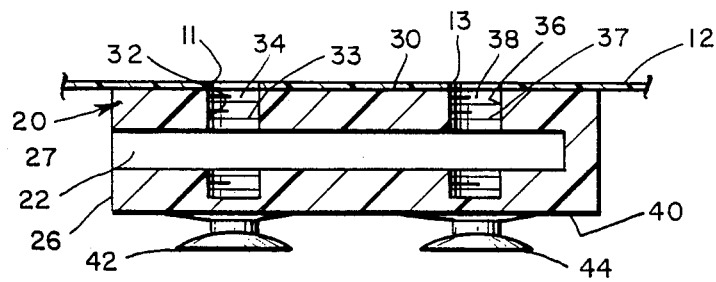
FIG. 3 is a cross-sectional view taken along line 3—3 of FIG. 2.

Although specific embodiments of the invention will now be described with reference to the drawings, it should be understood that such embodiments are by way of example only and merely illustrative of but a small number of the many possible specific embodiments which can represent applications of the principles of the invention. Various changes and modifications obvious to one skilled in the art to which the invention pertains are deemed to be within the spirit, scope and contemplation of the invention as further defined in the appended claims.

The present invention vehicle hood protector 10 is designed to fit smoothly over the hood of a vehicle 100 such that it covers the front part of the hood 110 of the vehicle 100. The primary protecting means is a one piece hood shield 12 which fits smoothly over the front portion of the hood of the vehicle. The specific hood shield 12 for any given vehicle 100 has appropriately designed openings such as 14 and 16 so that vehicle lights 112 and 114 will not be obstructed. The shield 12 also comprises an opening 18 so as not to interfere with other lights such as fog lights 116 and 118 and parking or high beam lights 120 and 122 and further so as not to interfere with the air intake and other accessories on the grill 124 of the vehicle 100. The hood shield 12 is made of clear and strong material such as plastic and engineered plastic materials such as Lexan-R. The functions of the hood shield 12 are that it be of clear material so as not to hide the color and stylized design of the hood 110 of the vehicle 100 and to be sufficiently thick and strong so as to provide an effective barrier of protection for the hood 110 when rocks, sand, and other road debris are thrown against the hood 110.

In addition to the one piece, clear and strong feature of the hood shield 12 of the hood protector 10, a major area of novelty of the present invention is the means by which the hood shield 12 is attached and held in place on the hood 110 of vehicle 100. The attaching means comprises four attaching blocks identical to retaining block 20, attached at the two front corners of the hood and at the intersection of the hood protector and the rearmost edges of the hood which are covered by the hood protector, as illustrated in FIG. 1. The following description for retaining block 20 will serve to describe the attaching system for all four attaching blocks since they are identical in attaching mechanism. Referring to FIGS. 2 through 7, retaining block 20 comprises interior longitudinal slot 22 which extends for most of the length of attaching block 20. Interior slot 22 has an opening 24 extending out of sidewall 26 of retaining block 20. A pair of spaced apart vertical shafts 32 and 36 extend through most of the thickness of retaining block 20 and extend out of the top 30 of attaching block 20. Vertical shaft 32 has opening 34 extending out top 30 and vertical shaft 36 has opening 38 extending out top 30. Hood shied 12 has corresponding openings 11 and 13. Opening 11 is aligned with opening 34 and opening 13 is aligned with opening 38. It will be appreciated that the invention is operative with at least one transverse opening or vertical shaft (either 32 or 36) and corresponding at least one opening out the top surface of the retaining block 20. The lower surface 40 of attaching block 20 has hood attaching retaining means which by way of example are a pair of suction cups 42 and 44. While two such suction cups are illustrated, it will be appreciated at the invention can be operative with at least one suction cup or comparable at least one retaining member.

Figures 4, 5:
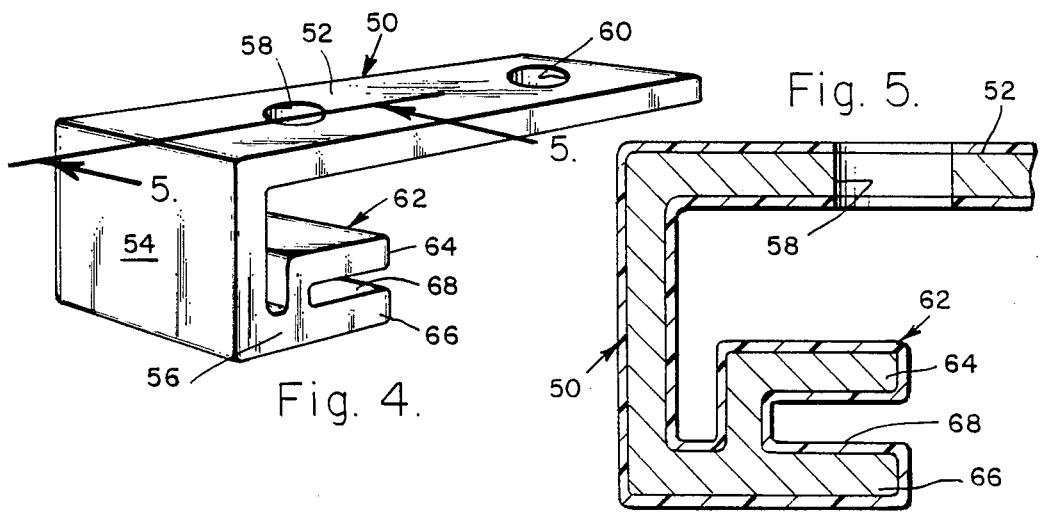
FIG. 4 is a perspective view of a retaining block attaching member which is inserted into a retaining block and serves to retain the retaining block and vehicle hood protector on the hood of a vehicle.
FIG. 5 is a cross-sectional view taken along line 5—5 of FIG. 4.
Figure 6:
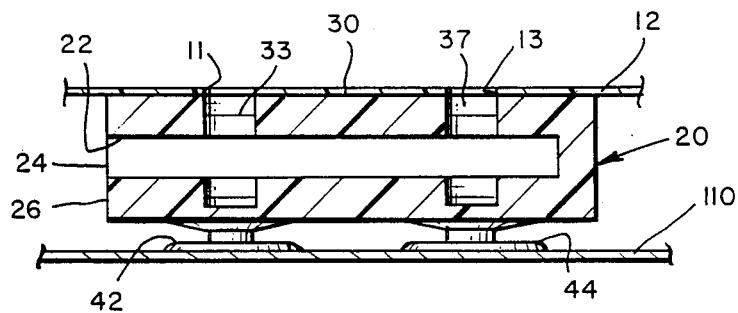
FIG. 6 is a partial cross-sectional view of a retaining block and hood protector mounted on the hood of a vehicle.

A retaining block attaching member 50 is illustrated in FIGS. 4 and 5. Retaining block attaching member 50 comprises three sections. An elongated upper section 52, a vertical section 54 and a grooved lower section 56.

Upper elongated section 52 is sized to fit into interior longitudinal slot 22 in retaining block 20. Upper elongated section 52 further comprises a pair of spaced apart openings 58 and 60 which extend through the entire thickness of upper elongated section 52 and are spaced to correspond to longitudinal shafts 32 and 36 respectively in retaining block 20. Lower section 56 further comprises a grooved endpiece 62 having upper portion 64 and lower portion 66 and defining channel 68 therebetween. The channel 68 is dimension to accommodate the end of the hood 110 of the vehicle 100. The vertical section 54 is dimensioned to permit the upper section 52 to be inserted into longitudinal slot 22 of retaining block 20 such that suction cups 42 and 44 rest on hood 110 while simultaneously channel 68 fits around an edge of hood 110 while vertical section 54 rests while the hood channel 130 defined between the edge 111 of hood 110 and the fender 140 of vehicle 100. While the invention has been described with two shafts 32 and 36, it will be appreciated at the invention is operative with at least one shaft 32, 36, or one inbetween their locations. In that case there is one one corresponding transverse opening the upper section 52.

Figure 7:
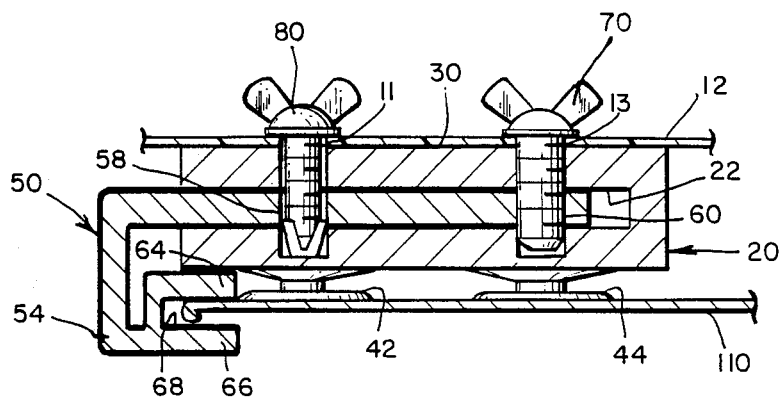
FIG. 7 is a partial cross-sectional view of a retaining block and hood protector retained on the hood of a vehicle by the attaching means, with the attaching means secured to the hood protector and retaining block.

With the retaining block attaching member 50 and retaining block 20 held on the hood in this manner as illustrated in FIG. 7, the hood shield 12 cannot be removed from the vehicle because the retaining block attaching member 50 is firmly held onto the edge 111 of hood 112 through insertion of channel 68 onto hood edge 111 with vertical portion 54 firmly wedged within the groove 130 between hood edge 111 and fender 140 and upper section 52 firmly held in slot 22 of attaching block 20 while attaching block 20 is firmly held on the hood 112 by suction cups 42 and 44. Further, securing means is inserted through opening 11 in hood shield 12 and into shaft 32 of attaching block 20, extending through opening 58 in upper section 52 of retaining block attaching member 50. Comparable securing means is inserted through opening 13 in hood shield 12 and into shaft 36 of retaining block 20, extending through opening 60 in upper section 52 of attaching block retaining member 50. One embodiment for the securing means is a one way snap in expansion bolt 80, illustrated in FIG. 7 as extending through opening 11, through opening 58 and through shaft 32. The one way snap in expansion bolt 80 expands to fill the shaft 32 and cannot be removed. Alternatively, shaft 32 and 36 may have threads 33 and 37 respectively and the securing means can be a threaded wing nut 70 which is threaded onto the threads in the shafts. Openings 58 and 60 may also have accommodating threads if desired, but this is not necessary for the device to be operative. The threaded wing nut does not provide a fully anti-theft device because then the wing nut can be unscrewed. If the wing nut 70 is a one-way wing nut, then the wing nut cannot be unscrewed and the device is once again an anti-theft securing means.

Referring to FIG. 1, the above described attachment assembly comprising the retaining block 20, retaining block attaching member 50, section cups 42 and 44, and securing means either 70 or 80 are positioned at location "A" as illustrated in FIG. 1. In the preferred embodiment, identical attachment means are located at positions "B", "C", and "D". The only difference is that the retaining block attaching member 50 is reversed 180 degrees at positions "C" and "D" from the view illustrated in FIGS. 2 through 7 so that the attaching block retaining member extends into the interior slot in the retaining block at those locations. Of course, vertical section 54 is wedged into groove 132 between hood edge 113 and fender 142 at positions "C" and "D". In the preferred embodiment as illustrated in FIG. 1, locations "A" and "D" are at the front corners of the hood 110 and locations "B" and "C" are at the intersection of the rear of the hood shield 12 and rearmost corners of the portion of the hood 110 protected by the hood shield 12.

The attaching means as described above serves to retain the hood shield 12 in a manner by which it cannot be stolen. With the hood 110 in the closed position it is impossible to remove the hood shield 12, even if the securing means 70 or 80 are removed. The four attachment means located at locations "A", "B", "C", and "D" firmly hold the hood shield 12 on the hood 110 through the suction cups 42 and 44 on each attaching block 20 and each retaining block 20 is firmly held on the hood in a non-removable fashion by its retaining block attaching member 50 firmly placed in interior slot 22 and secured onto the edge of the hood. Furthermore, the entire hood can be raised to get at the engine compartment without the necessity of removing the hood shield 12 from the hood 110. In the event the owner desires to remove the hood shield 12, and if non-one-way securing means 70 and 80 are used, then the securing means must be removed and with the hood 110 in the raised or open position, each retaining block attaching member 50 can be slid out of the interior channel 22 of its respective attachment block 20 and thereafter an upward pressure on the hood shield 12 will cause the suction cups 42 and 44 from each retaining block 20 to be released from the hood 100.

To install or reinstall the hood protector 10 on the vehicle, four retaining blocks 20 are placed on the hood 110 at the locations "A", "B", "C", and "D", with the respective suction cups 42 and 44 retaining the retaining blocks 20 on the hood 110. The the hood shield 12 is placed over the hood with respective openings 11 and 13 aligned with openings 34 and 36 in each respective retaining block 20. Thereafter, with the hood in the open position, each respective retaining block attaching member 50 is slid into its respective retaining block with openings 58 and 60 in upper section 52 aligned with shafts 32 and 36 in each respective retaining block and channel 68 pressed onto the corresponding edge of the hood 110. The hood 110 is then lowered to the closed position. Thereafter securing means 70 or 80 are inserted through the openings as previously described and the assembly is complete. The hood protector 10 provides a clear and decorative fixture to protect the hood is attached in a manner which prevents the hood shield 12 from being removed when the hood is closed. Since most modern cars have locking mechanisms which prevent the hood from being opened unless an interior mechanism adjacent the driver's side of the car is activated, one could not remove the hood protector 10 unless he has access to the interior of the vehicle.

The present invention hood protector 10 can be used with any desired vehicle. While the most frequent use will be with expensive sports cars, any car, truck or other vehicle can utilize the present invention. It is anticipated that the configuration of the hood protector 10 will be designed to accommodate the shape of the hood of the specific vehicle for which it will be used. Any multiplicity of shapes of hood protectors are within the spirit and scope of the present invention and any shape to accommodate any style hood can be retained by the mechanism of the present invention.

Therefore, the present invention can be defined as a vehicle hood protector in which the vehicle has at least a vehicle hood, two front fenders on either side of the vehicle hood, the hood being defined by two side edges adjacent a respective front fender and a hood channel between an edge of the vehicle hood and its adjacent fender, the vehicle hood protector, comprising:

a. a one piece hood shield which is sized to conform to the shape of the front portion of the vehicle hood and front fenders of the vehicle when laid over the vehicle hood and front fenders;

b. a multiplicity of retaining blocks, with a respective one retaining block spaced on the vehicle hood adjacent one of the side edges of the vehicle hood;

c. each retaining block having a top surface, a bottom surface, transverse ends, and further comprising,
 (i) at least one retaining member on its lower surface which serves to retain the retaining block on the vehicle hood,
 (ii) an interior longitudinal slot extending for most of the length of the retaining block and opening out the transverse end of the retaining block adjacent the side edge of the vehicle hood proximate the location of the retaining block,
 (iii) at least one transverse shaft extending through most of the thickness of the retaining block and opening out of the top surface of the retaining block, the transverse shaft intersecting a portion of the longitudinal interior slot;

d. a mating retaining block attaching member for each retaining block, further comprising,
 (i) an upper elongated section sized to fit into the interior longitudinal slot of a retaining block and having at least one transverse opening located to be in alignment with the at least one transverse shaft of a retaining block when the upper elongated section is inserted into the interior longitudinal slot of the retaining block,
 (ii) a lower section having a grooved endpiece defining a channel which is dimensioned to accommodate a portion of a side edge of the vehicle hood,
 (iii) a vertical section joining the upper elongated section and the lower section and sized to permit the upper elongated section to fit into the longitudinal slot of a retaining block while simultaneously permitting the channel in the grooved endpiece of the lower section to receive a portion of a side edge of the vehicle hood, a portion of the vertical section resting within a hood channel;

e. said one piece hood shield having a least one transverse opening at each of the locations where the retaining block and retaining block attaching member assemblies are positioned, with said at least one transverse opening at each location aligned with the opening of the transverse shaft and the opening in the longitudinal upper section of the retaining block attaching means; and f. a securing means for each retaining block and retaining block attaching means extending through the at least one transverse opening in the one piece hood shield, through the opening of the transverse shaft in the retaining block and through the at least one opening in the longitudinal upper section of the retaining block attaching means at each of the assembly locations to thereby join the one piece hood shield, the retaining block and the retaining block attaching member together at each of the assembly locations.

Defined more broadly, the present invention is a vehicle hood protector in which the vehicle has at least a vehicle hood, two front fenders on either side of the vehicle hood, the hood being defined by two side edges adjacent a respective front fender, the vehicle hood protector, comprising:

a. a one piece hood shield which is sized to conform to the shape of the front portion of the vehicle hood and front fenders of the vehicle when laid over the vehicle hood and front fenders; and b. a multiplicity of retaining assemblies located adjacent each of the two side edges of the vehicle hood and resting between the vehicle hood and the one piece hood shield, each retaining assembly having means for affixing the assembly to a portion of one of the side edges of the vehicle hood and means for affixing the assembly to a portion of the one piece hood shield.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus is intended only for illustration and for disclosure of an operative embodiment and not to show all of the various forms or modification in which the invention might be embodied or operated.

The invention has been described in considerable detail in order to comply with the patent laws by providing full public disclosure of at least one of its forms. However, such detailed description is not intended in any way to limit the broad features or principles of the invention, or the scope of patent monopoly to be granted.

What is claimed is:

1. A vehicle hood protector in which the vehicle has at least a vehicle hood, two front fenders on either side of the vehicle hood, the hood being defined by two side edges adjacent a respective front fender and a hood channel between an edge of the vehicle hood and its adjacent fender, the vehicle hood protector, comprising:

a. a one piece hood shield which is sized to conform to the shape of the front portion of the vehicle hood and front fenders of the vehicle when laid over the vehicle hood and front fenders;

b. four retaining blocks, with a respective one retaining block spaced at the two front corners of the vehicle hood and adjacent a respective side edge of the vehicle hood and at the rear intersections of the hood shield and rearmost areas of the portion of the vehicle hood adjacent its sides edges over which the hood shield lays;

c. each retaining block having a top surface, a bottom surface, transverse ends, and further comprising,
 (i) at least one suction member on its lower surface which serves to retain the retaining block on the vehicle hood,
 (ii) an interior longitudinal slot extending for most of the length of the retaining block and opening out the transverse end of the retaining block adjacent the side edge of the vehicle hood proximate the location of the retaining block, (iii) at least one transverse shaft extending through most of the thickness of the retaining block and opening out of the top surface of the retaining block, the transverse shaft intersecting a portion of the longitudinal interior slot;

d. a mating retaining block attaching member for each retaining block, further comprising,
  (i) an upper elongated section sized to fit into the interior longitudinal slot of a retaining block and having at least one transverse opening located to be in alignment with the at least one transverse shaft of a retaining block when the upper elongated section is inserted into the interior longitudinal slot of the retaining block,
  (ii) a lower section having a grooved endpiece defining a channel which is dimensioned to accommodate a portion of a side edge of the vehicle hood,
  (iii) a vertical section joining the upper elongated section and the lower section and sized to permit the upper elongated section to fit into the longitudinal slot of a retaining block while simultaneously permitting the channel in the grooved endpiece of the lower section to receive a portion of a side edge of the vehicle hood, a portion of the vertical section resting within a hood channel;

e. said one piece hood shield having a least one transverse opening at each of four locations where the retaining block and retaining block attaching member assemblies are positioned, with said at least one transverse opening at each location aligned with the opening of the transverse shaft and the opening in the longitudinal upper section of the retaining block attaching means; and f. a securing means for each retaining block and retaining block attaching means extending through the at least one transverse opening in the one piece hood shield, through the opening of the transverse shaft in the retaining block and through the at least one opening in the longitudinal upper section of the retaining block attaching means at each of the four locations to thereby join the one piece hood shield, the retaining block and the retaining block attaching member together at each of the four locations.

2. A hood protector in accordance with claim 1 wherein said securing means is a one way expansion bolt.

3. A hood protector in accordance with claim 1 wherein said vertical shaft in each retaining block further comprises threads on its wall and said securing means is a threaded one way wing nut which is threaded into the vertical shaft.

4. A hood protector in accordance with claim 1 wherein said one piece hood shield is made of clear plastic material.

5. A vehicle hood protector in which the vehicle has at least a vehicle hood, two front fenders on either side of the vehicle hood, the hood being defined by two side edges adjacent a respective front fender and a hood channel between an edge of the vehicle hood and its adjacent fender, the vehicle hood protector, comprising:
  a. a one piece hood shield which is sized to conform to the shape of the front portion of the vehicle hood and front fenders of the vehicle when laid over the vehicle hood and front fenders;
  b. a multiplicity of retaining blocks, with a respective one retaining block spaced on the vehicle hood adjacent one of the side edges of the vehicle hood;
  c. each retaining block having a top surface, a bottom surface, transverse ends, and further comprising,
    (i) at least one retaining member on its lower surface which serves to retain the retaining block on the vehicle hood,
    (ii) an interior longitudinal slot extending for most of the length of the retaining block and opening out the transverse end of the retaining block adjacent the side edge of the vehicle hood proximate the location of the retaining block,
    (iii) at least one transverse shaft extending through most of the thickness of the retaining block and opening out of the top surface of the retaining block, the transverse shaft intersecting a portion of the longitudinal interior slot;
  d. a mating retaining block attaching member for each retaining block, further comprising,
    (i) an upper elongated section sized to fit into the interior longitudinal slot of a retaining block and having at least one transverse opening located to be in alignment with the at least one transverse shaft of a retaining block when the upper elongated section is inserted into the interior longitudinal slot of the retaining block,
    (ii) a lower section having a grooved endpiece defining a channel which is dimensioned to accommodate a portion of a side edge of the vehicle hood,
    (iii) a vertical section joining the upper elongated section and the lower section and sized to permit the upper elongated section to fit into the longitudinal slot of a retaining block while simultaneously permitting the channel in the grooved endpiece of the lower section to receive a portion of a side edge of the vehicle hood, a portion of the vertical section resting within a hood channel;
  e. said one piece hood shield having a least one transverse opening at each of the locations where the retaining block and retaining block attaching member assemblies are positioned, with said at least one transverse opening at each location aligned with the opening of the transverse shaft and the opening in the longitudinal upper section of the retaining block attaching means; and
  f. a securing means for each retaining block and retaining block attaching means extending through the at least one transverse opening in the one piece hood shield, through the opening of the transverse shaft in the retaining block and through the at least one opening in the longitudinal upper section of the retaining block attaching means at each of the assembly locations to thereby join the one piece hood shield, the retaining block and the retaining block attaching member together at each of the assembly locations.

6. A hood protector in accordance with claim 5 wherein said securing means is a one way expansion bolt.

7. A hood protector in accordance with claim 5 wherein said vertical shaft in each retaining block further comprises threads on its wall and said securing means is a threaded one way wing nut which is threaded into the vertical shaft.

8. A hood protector in accordance with claim 5 wherein said one piece hood shield is made of clear plastic material.

* * * * *